United States Patent Office 3,104,860
Patented Sept. 24, 1963

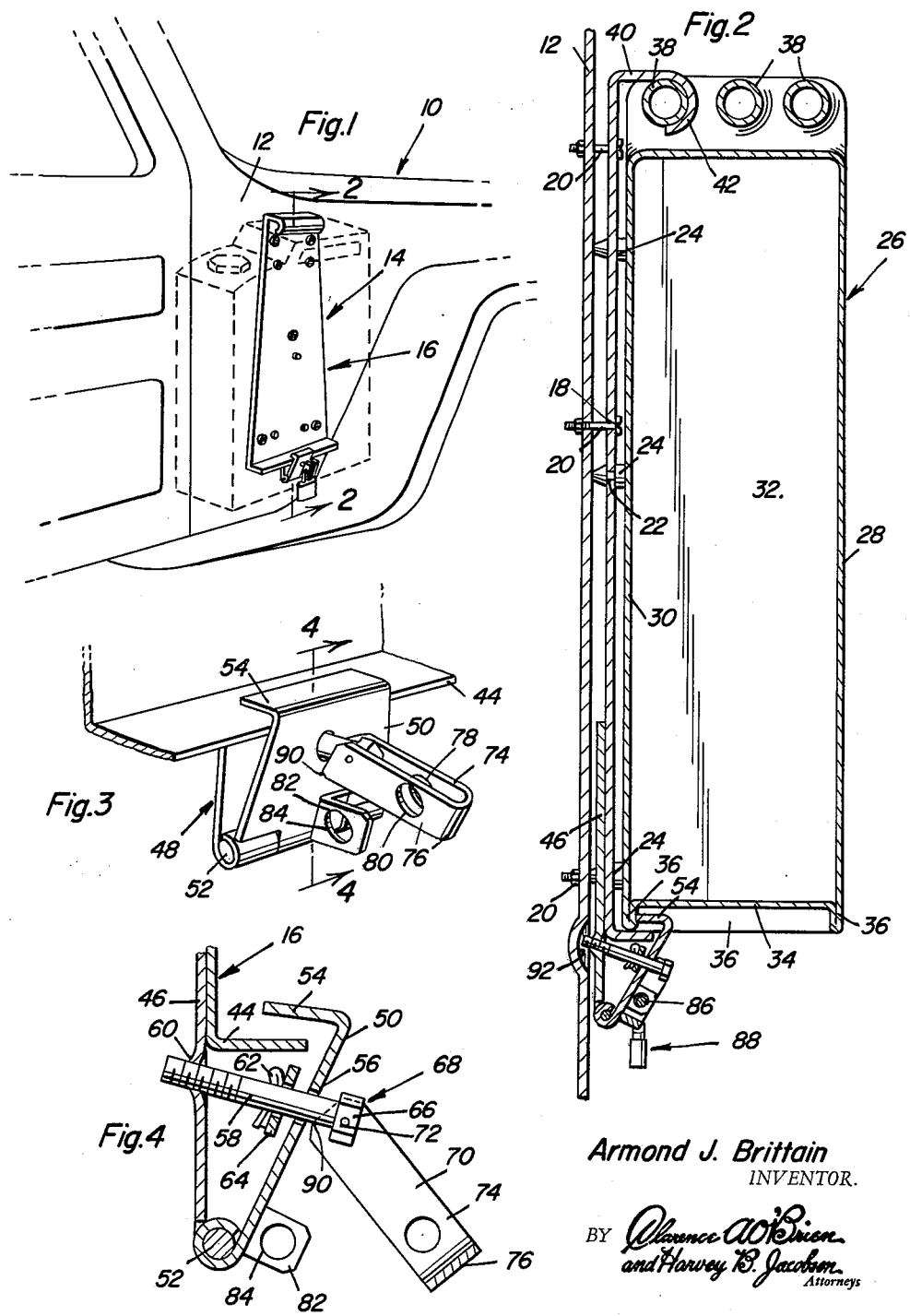

3,104,860
FUEL CAN HOLDER
Armond J. Brittain, 822 W. Works St., Sheridan, Wyo.
Filed May 3, 1961, Ser. No. 107,465
7 Claims. (Cl. 248—313)

This invention relates to a novel and useful fuel can holder and more specifically to a fuel can holder which may be fixedly secured to a vehicle body panel and utilized as a supporting bracket for removably securing a fuel can to the vehicle body panel to which the fuel can holder is secured. Although the fuel can holder of the instant invention has been specifically adapted to removably secure a particular type of fuel can to the side of a vehicle, it is to be noted that the fuel can holder may be slightly modified without departing from the spirit of the instant invention in order to adapt the fuel can holder for supporting other types of fuel cans.

The main object of this invention is to provide a fuel can holder which may be readily rigidly secured to a vehicle body panel and is adapted to removably secure a fuel can to the body panel with the fuel can disposed in spaced relation relative to the body panel.

A further object of this invention, in accordance with the immediately preceding object, is to provide a fuel can holder specifically adapted to support a fuel can in an upright position in spaced relation relative to a vehicle body panel against vertical movement relative to the body panel and lateral movement toward and away from the body panel.

Still another object of this invention is to provide a fuel can holder specifically adapted to secure a fuel can to an upright body panel of a vehicle in a manner whereby the fuel can may be readily detached from engagement with the fuel can holder.

A final object to be specifically enumerated herein is to provide a fuel can holder in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the fuel can holder of the instant invention shown mounted upon an upright vehicle body panel, the outline of a fuel can being supported by a fuel can holder shown in phantom lines;

FIGURE 2 is an enlarged vertical sectional view taken substantially upon the plane indicated by the section line 2—2 of FIGURE 1, the fuel can being shown in solid lines and clearly illustrating the manner in which the fuel can may be supported by the fuel can holder;

FIGURE 3 is a fragmentary enlarged perspective view of the lower portion of the fuel can holder more clearly illustrating the structural details of the clamping means carried by the lower end of the fuel can holder; and FIGURE 4 is a fragmentary enlarged vertical sectional view taken substantially upon the plane indicated by the section line 4—4 of FIGURE 3.

Referring now more specifically to the drawings the numeral 10 generally designates a conventional type of vehicle which includes an upright cowl panel 12.

The fuel can holder of the instant invention is generally designated by the reference numeral 14 and comprises a mounting plate generally referred to by the reference numeral 16. The mounting plate 16 is suitably apertured as at 18, see FIGURE 2, and a plurality of fasteners 20 are passed through the apertures 18 and are secured through the cowl panel 12 in order to rigidly secure the mounting plate 16 to the cowl panel 12. The mounting plate 16 is also suitably apertured as at 22, see FIGURE 2, and a resilient grommet 24 is secured through each of the apertures 22 and projects from opposite sides of the mounting plate 16. In this manner, the portions of the resilient grommets 24 projecting from the side of the mounting plate 16 opposing the cowl panel 12 comprise resilient abutment means for retaining the mounting plate 16 in spaced relation relative to the cowl panel 12.

The fuel can adapted to be supported by the fuel can holder 14 is generally designated by the reference numeral 26 and includes opposite side walls 28 and 30, opposite end walls 32 and a bottom wall 34. The bottom wall 34 extends between the lower edges of the opposite side walls 28 and 30 and the opposite end walls 32 a spaced distanced above the lower end of the can 26. Thus, each of the side walls 28 and 30 includes a depending support flange 36 as do the end walls 32. The fuel can 26 also includes a plurality of tubular handle members 38 which extend transversely of the upper end of the can 26 and generally parallel the side walls 28 and 30.

The upper end of the mounting plate 16 includes a laterally and outwardly projecting flange which terminates at its free end in a smoothly curved and downwardly directed and back-turned end portion or hook 42. The end portion 42 removably and rotatably receives the handle 38 adjacent the side wall 30 as can best be seen in FIGURE 2 of the drawings and the ends of the grommets 24 projecting beyond the face of the mounting plate 16 opposing the side wall 30 of the can 26 maintain the side wall 30 in spaced relation relative to the mounting plate 16.

The lower end of the mounting plate 16 includes a laterally and outwardly directed support flange 44 which underlies and supports the support flange 36 on the lower end of the side wall 30. Additionally, the lower end of the mounting plate 16 has the free end of a hinge plate 46 of a hinge assembly generally referred to by the reference numeral 48 fixedly secured thereto in any convenient manner such as by welding. A clamping jaw or hinge plate 50 is pivotally secured to the hinge plate 46 by means of hinge pin 52 at one end of the hinge plate 50 and the free end of the hinge plate 50 includes a laterally or angularly directed retaining flange portion 54 extending toward the hinge plate 46. It will be noted that the hinge assembly 48 comprises clamp means for clampingly urging the support flange 36 carried by the side wall 30 toward the mounting plate 16. The hinge plate 50 is suitably apertured as at 56 and the shank 58 of a headed screw or fastener is passed through the aperture 56 and is threadedly engaged in a threaded aperture 60 formed in the hinge plate 46. An abutment member 62 is carried by the shank 58 and a washer 64 is disposed between the abutment member 62 and the adjacent face of the hinge plate 50. The head 66 of the fastener generally referred to by the reference numeral 68 has a lever cam or member 70 pivotally secured thereto by means of pivot pin 72 and it will be noted that the lever member 70 is generally U-shaped in cross section and includes a pair of legs 74 interconnected at corresponding ends by means of a bight portion 76. The legs 74 are provided with aligned apertures 78 and 80 respectively and a retaining lug 82 is fixedly secured to the hinge plate 50 and is suitably apertured as at 84. The apertures 78 and 80 are registrable with the aperture 84 as can be most clearly seen in FIGURE 2 of the drawings and the hasp 86 of a padlock generally referred to by the reference numeral 88 may be passed through the aligned apertures 78, 80 and 84 to retain the lever 70 in the position illustrated in FIGURE 2 of the drawings.

Each leg 74 of the lever 70 includes a fulcrum point or cam 90 and upon movement of the lever 70 out of longitudinal alignment with the fastener 68 it will be observed that the fulcrum points 90 will engage the hinge plate 50 and urge the latter toward the hinge plate 46 as the lever 70 is pivoted to the position illustrated in FIGURE 2 of the drawings. In this manner, the retaining flange 54 may be utilized to urge the support flange 36 carried by the side wall 30 towards the mounting plate 16.

If it is desired, the cowl panel 12 may be provided with a recess 92 in order to provide clearance for the end of the shank 58 remote from the head 66 of the fastener 68. However, the outer surface of the hinge plate 46 may be struck outwardly in the general area in which the threaded aperture 60 is formed in order that the shank 58 of the fastener 68 may be shorter thereby eliminating the necessity for the recess 92.

In operation, the threaded fastener 68 is first backed out of the threaded aperture 60 whereupon the hinge plate 50 may have its free end swung outwardly away from the hinge plate 46. The fuel can 26 may then have its upper end inwardly inclined and engaged with the backturned end portion 42 as illustrated in FIGURE 2 of the drawings. Then, the lower end of the fuel can 26 may be pivoted toward the mounting plate 16 and the hinge plate 50 may be pivoted to the position illustrated in FIGURE 4 of the drawings. Then, the threaded fastener 68 may be engaged with the threaded aperture 60 in order to move the abutments comprising the fulcrum points 90 toward the hinge plate 50. When the fastener 68 has been positioned approximately as illustrated in FIGURE 4 of the drawings, the lever 70 may be pivoted to the position illustrated in FIGURE 2 of the drawings whereupon the fulcrum points 90 will engage the outer face of the hinge plate 50 and move the free end of the hinge plate 50 toward the mounting plate 16. Accordingly, the retaining flange 54 may thus be moved into engagement with the supporting flange 36 carried by the lower end of the side wall 30 in order that the lower end of the can 26 may be moved toward a seated position closely adjacent the mounting plate 16 with the portions of the grommets 24 projecting from the outer face of the mounting plate 16 slightly compressed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A container holder comprising a plate for mounting on a support, means for supporting a container on said plate, and means for locking the container on the plate, the last-named means including a screw threadedly mounted for adjustment on the plate, a movable jaw mounted on the plate and operable on the screw and clampingly engageable with the container, and a lever cam pivotally mounted on the screw and operatively engageable with the jaw for engaging same with the container.

2. A container holder in accordance with claim 1, said jaw being hingedly connected at one end to the plate and having an opening therein at an intermediate point loosely accommodating the screw, said jaw comprising an angularly extending free end portion engageable with the container.

3. A container holder in accordance with claim 2, together with a lug on the jaw, said lower cam being generally U-shaped and straddling the screw and adapted to straddle the lug, said lug and lever cam having registrable openings therein for receiving a lock for securing said lever cam in operative position.

4. A fuel can holder comprising a vertical plate for mounting on a support, a supporting flange on the lower end portion of the plate engageable beneath a fuel can, a retaining hook on the upper end of the plate engageable with the can, a screw threadedly mounted for adjustment on the plate below the flange, a jaw hingedly mounted on the plate for retaining the can on the flange, said jaw being operable on the screw, and a lever cam pivotally mounted on the screw and operatively engageable with the jaw for clampingly engaging said jaw with the can.

5. A fuel can holder in accordance with claim 4, said jaw having an opening therein receiving the screw, said jaw terminating in a rearwardly angularly bent free end portion engageable with the can over the flange.

6. A fuel can holder in accordance with claim 5, together with means on the jaw for securing the lever cam in operative position.

7. The combination of claim 6, said lever cam being generally U-shaped and mounted astraddle the screw, said means including a lug affixed to the jaw and engageable in the lever cam, said lug and said lever cam having registrable openings therein for the reception of a lock.

References Cited in the file of this patent
UNITED STATES PATENTS

| | | |
|---|---|---|
| 1,613,111 | Johnson | Jan. 4, 1927 |
| 1,915,249 | Jorgensen | June 20, 1933 |
| 2,883,139 | Dobkin | Apr. 21, 1959 |